United States Patent
Benimeli et al.

(10) Patent No.: US 7,298,147 B2
(45) Date of Patent: Nov. 20, 2007

(54) DEVICE AND PROCESS FOR DETERMINATION OF THE RESISTIVITY OF A FORMATION SURROUNDING A CASED BOREHOLE

(75) Inventors: Dominique Benimeli, Chatillon (FR); Cyrille Levesque, Abu Dhabi (AE); Donald McKeon, Grosse Pointe Park, MI (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 10/527,926

(22) PCT Filed: Sep. 17, 2003

(86) PCT No.: PCT/EP03/10353

§ 371 (c)(1), (2), (4) Date: Apr. 24, 2006

(87) PCT Pub. No.: WO2004/029663

PCT Pub. Date: Apr. 8, 2004

(65) Prior Publication Data
US 2006/0250136 A1    Nov. 9, 2006

(30) Foreign Application Priority Data
Sep. 25, 2002  (FR)  .................... 02 11837

(51) Int. Cl.
*G01V 3/02*    (2006.01)

(52) U.S. Cl. .................. 324/368; 324/347; 324/348

(58) Field of Classification Search ................ 324/368, 324/347, 369, 370–373, 375, 348
See application file for complete search history.

(56) References Cited

U.S. PATENT DOCUMENTS

| | | |
|---|---|---|
| 4,796,186 A | 1/1989 | Kaufman |
| 5,339,037 A | 8/1994 | Bonner et al. |
| 5,680,049 A | 10/1997 | Gissler et al. |
| 6,353,322 B1 | 3/2002 | Tabarovsky et al. |

OTHER PUBLICATIONS

Karsani Aulia et al "Resistivity Behind Casing" Oilfield Review, Elsevier, Amsterdam NL, vol. 13, No. 1, Mar. 21, 2001 pp. 2-25.

*Primary Examiner*—Reena Aurora
(74) *Attorney, Agent, or Firm*—James L. Kurka; Kevin P. McEnaney; Dale V. Gaudier

(57) ABSTRACT

Body (22) for measuring the resistivity of a formation (9) surrounding a well (10) equipped with a lining (11), comprising: a body (23) of a probe (22), a set of three primary voltage measurement electrodes (ea, eb, ec), an upper electrode (ea) and a lower electrode (ec) and a central electrode (eb), two electrodes (In1, In2), an upper current injection electrode (In1) and a lower current injection electrode (In2) arranged on each side of the set of primary electrodes, characterized in that it also comprises, two secondary voltage measurement electrodes (24, 26) arranged on each side of the set of primary electrodes (ea, eb, ec), and between the two current injection electrodes (In1, In2), the spacing between a secondary electrode (24, 26) and the closest primary end electrode (ea, ec) being more than 1.5 times the spacing between the primary electrodes (ea, eb, ec).

4 Claims, 5 Drawing Sheets

DEVICE AND PROCESS FOR DETERMINATION OF THE RESISTIVITY OF A FORMATION SURROUNDING A CASED BOREHOLE

TECHNICAL FIELD

The invention relates to a device and a process for determination of the resistivity of a geological formation through which a well equipped with an electrically conducting lining passes.

It is known that the resistivity of a geological formation depends essentially on the fluid contained in it. Resistivity measurements of formations passed through are frequently made to evaluate saturation in fluid (essentially water (salt or fresh), hydrocarbons (crude oil, gas), or a mix of one or several of these fluids), to decide whether or not to put an oil well into production. A formation containing salt water has a much lower resistivity than a formation containing hydrocarbons.

STATE OF PRIOR ART

These formation resistivity measurements are made using devices fitted with electrodes to measure currents or voltages.

Resistivity diagraphs have been made in open holes for several decades.

Resistivity measurements have been made in wells reaching hydrocarbon reservoirs in operation and these wells are lined. These measurements locate water-hydrocarbon interfaces and monitor the change in position of these interfaces with time, in order to modify the behavior of the hydrocarbon reservoir and to optimize production.

These resistivity measurements in lined wells are not easy since the resistivity of the lining (of the order of $2 \times 10^{-7}$ $\Omega$.m for a steel lining) is very small compared with the resistivity of the formation (between about 1 and $10^3$ $\Omega$.m) and the lining is a barrier to transferring a current into the formation around the well beyond the lining.

The measurement principle consists of circulating an electrical current along the lining under conditions such that a leak or current loss occurs towards the formation. This leak depends on the resistivity of the formation and is higher when the formation is a good conductor. It is evaluated by making voltage drop measurements between electrodes placed at different levels in the well. These voltage drops are of the order of a few nanovolts.

This measurement principle is described in a large number of patents, for example in French patent application FR-A1-2 793 031 [1] and FR-A1-2 793 032 [2] issued by the applicant, or in articles such as for example the article in the spring 2001 review, the references of which are given in [3] at the end of the description.

The measurement principle is summarized briefly below. Refer to FIG. 1 attached to these application, which shows a cross-section through a well 10 with centerline XX' fitted with a metallic lining 11, in a formation 9. The level at which the measurement is made is marked b. Consider a section a-c of the lining 11 extending on each side of level b. A current is circulated in the lining 11 with a return remote from level b, for example at the surface. A leakage current Ifor occurs in the formation 9 and, in terms of the electrical circuit, this leakage current is equivalent to the current circulating in a shunt resistance Rt placed between level b and infinity. The value of this shunt resistance Rt is representative of the resistivity (also called Rt) of the formation at level b. According to Ohm's law, we can thus write:

$$Rt = K(V_{b,\infty}/\text{Ifor})$$

K is a geometric constant known as the tool factor, which can be determined particularly by calibration, by taking measurements in an impermeable zone in the formation 9 for which the resistivity is already known from measurements made in open holes made before the well was put into production.

$V_{b,\infty}$ is the potential at level b relative to a point at infinity. It is measured using an electrode eb placed at level b in electrical contact with the inside of the lining 11 and a reference electrode (not shown) that may be placed on the surface.

Ifor is the leakage current in the formation 9 at level b, and may for example be determined using the method described in patent application FR-A1-2 793 031 [1].

The first step is to inject a low frequency alternating current using a current injection electrode, not shown, contained in the lining and put into contact with the lining 11 at a position In1 or In2, in order to create a leakage current to the formation 9. In the second step, called the calibration step, a DC current is injected that is measured between two points on the lining so as to calculate the resistivity of the lining.

As described in [3], the tooling may comprise four voltage detection electrodes, three of which (ea, eb and ec) are shown in FIG. 1. These electrodes are equidistant, two consecutive electrodes being separated from each other by 60 cm. Three of the four electrodes are used for each measurement. The fact of having a tooling with four measurement electrodes instead of only three necessary for a measurement, means that two measurements can be made for each tool position, and the measurement principle described herein is not affected as a result.

The voltage drop between the electrodes in a pair of electrodes chosen among the four voltage detection electrodes results in a combination of losses due to leakage currents in the formation 9 and resistive losses along the tube. The first two steps measure the voltage drop resulting from the sum of these losses.

In the first step, the injection of a current into the lining 11 at a level In1 of the lining or at level In2 of the lining located on the side opposite the first point In1 from the group of the three electrodes causes a leakage current in the formation, and electrodes ea, eb, ec, placed at levels a, b, c respectively, are used to measure the potential drops along the lining sections a-b and b-c.

The second step called the calibration step determines resistive losses due to the tube:

For this step, a current is injected from the same position on the upper current injection electrode In1, but for the calibration, the current detection electrode located about 10 meters lower at level In2 is activated on the measurement tool so that it is in contact with the tube. Consequently, during this step, the current passes along the tube to the current detection electrode and in this case leakage currents to formation 9 are negligible, since in this case the current circuit is closed without passing through the formation 9. Voltages are measured on the same voltage electrodes and at the same positions as those used in the first step, and the measured injected voltage and current values can be used to determine the resistivity of the lining.

The leakage current Ifor in the formation 9 is determined by calculation from the measurement results, and the result is a proportionality coefficient close to the value of the resistivity of the formation.

The voltage $V_0$ of the lining is obtained by sending a DC current into the lining through the upper current injection electrode located at level In1. The current follows the same path as in the first step. A measurement is made of the voltage between the bottom current injection electrode which may be used as a voltage electrode because it is disconnected from the lining, and a reference electrode located on the surface as far as possible from the well head. The measurement is made twice, once with a positive polarity and once with a negative polarity in order to eliminate systematic errors such as polarization errors or drift. One depth measurement for ten positions is usually sufficient, since the voltage varies little as a function of the depth of the bottom current electrode.

The method described above can be used to measure resistivity differences of the formations varying from 1 to 100. This means that the measurement method will impose a limit for a very high resistivity to the value of 100, and it will be impossible to determine differences between resistivity values of the formation for which the measured resistivity is equal to this maximum value. The spatial resolution of the measurement is about twice the value of the space between consecutive voltage measurement electrodes, for example 1.2 m if these electrodes are at a spacing of 60 cm.

PRESENTATION OF THE INVENTION

This invention relates to a device and a process to improve the measurement range of the resistivity of formations in which a lining is located.

According to the invention, a measurement probe similar to those used in prior art is used, but it is modified by the addition of additional electrodes as described below. Note that the probe according to prior art contains upper and lower current injection electrodes, and a minimum of three voltage measurement electrodes between these current injection electrodes. The set of voltage measurement electrodes made according to prior art will subsequently be called a set of primary electrodes in the rest of this description. According to the invention the set of for example three or four primary electrodes comprising the upper and lower end electrodes and one or several central electrodes, is supplemented by a set of two additional voltage measurement electrodes subsequently called secondary electrodes in this description, located between the current injection electrodes. These additional electrodes are also arranged in the probe on each side of the set of primary electrodes. The two additional voltage measurement electrodes are each at a distance from the end primary electrode closest to them greater than the average distance between consecutive primary electrodes. The spacing between a secondary electrode and the primary electrode closest to it may for example be more than 1.5 times the average spacing between consecutive primary electrodes.

The measurement method using this modified probe comprises the same steps as those described above in relation to prior art. This first measurement phase will be called the primary phase in the rest of this description. According to the invention, the measurement method comprises an additional step called the secondary measurement in which the leakage current Ifor in the formation will be measured using at least one primary electrode and the two secondary electrodes. A larger spacing between the measurement electrodes gives a larger leakage current Ifor in the formation for the secondary measurement. The result is that the value of the signal to noise ratio of the measurement of this current is increased. The result is a larger measurement range for the resistivity of the formation. However, the spatial resolution of the resistivity measured during the additional step is lower, precisely due to the greater distance between the measurement electrodes. According to the invention, the primary and secondary steps are combined. Thus, the primary measurement results are used, as in prior art, to determine the depths at which the resistivity value of the formation through which the lining passes changes, and the secondary measurement results give an improved range of the value of these changes.

Thus, this invention relates to a probe for measuring the resistivity of a geological formation surrounding a well equipped with a lining conducting electricity comprising:

a probe body that is approximately cylindrical, defining an axial direction of the probe, a set of at least three primary voltage measurement electrodes, two end electrodes at the top and bottom and at least one central electrode, a spacing between consecutive electrodes in this set of primary electrodes in the axial direction of the probe body with an average spacing value, two electrodes, an upper current injection electrode and a lower current injection electrode arranged along the axial direction of the measurement probe body, on each side of the set of primary electrodes, characterized in that it also comprises, two secondary voltage measurement electrodes arranged along the axial direction of the probe on each side of the set of the primary electrodes, and a first secondary electrode between the two injection electrodes, located between the upper current injection electrode and the upper voltage measurement electrode, the other being located between the lower current injection electrode and the lower end voltage measurement electrode, the spacing between a secondary electrode and the closest primary end electrode being more than 1.5 times the average spacing between the primary electrodes.

In one example embodiment, the spacing between the two secondary electrodes is of the order of six to seven times the average spacing between consecutive primary voltage measurement electrodes.

In one preferred embodiment, the primary or secondary voltage measurement electrodes consist of conducting rings with a diameter with a value equal to approximately the value of the diameter of the probe body.

The invention also relates to a process for determining an improved profile of the variation along an axial direction of the resistivity of a geological formation surrounding a well equipped with a lining along the said axial direction, in which a local resistivity of the formation is determined by injecting a current in the lining to create a leakage current in the formation measurement zone and measuring the potential values at first positions with a spacing between consecutive positions equal to an average value, the first positions comprising at least one central position between a top end position and a bottom end position along the axial direction, and using the measurement results to calculate a local value of the leakage current in the formation to determine a value of the resistivity of the said formation in the said measurement zone and then to restart the measurement by moving the first potential measurement positions along the axial direction, to deduce a first profile of the variation of the resistivity along the axial direction, process characterized in that for each local potential measurement made in the first positions, a potential measurement at two second positions is made simultaneously on each side of the first positions, a second position being at a distance from the closest first end position equal to at least 1.5 times the average value of the spacing between consecutive positions to deduce a second profile for the variation of the resistivity along the axial direction and then to correct the first profile by replacing resistivity values of the first profile for the first axial positions by resistivity values of the second profile when the resistivity values of the second profile at the same first axial positions are greater than the first values, the corrected profile forming the improved profile.

The leakage current in the measurement zone is determined, and the leakage current in the formation is determined, using a probe fitted with primary and secondary measurement electrodes as described above, this probe being moved in steps in the lining to put it at the levels of successive measurement zones.

The current may be injected into the lining by means of the probe equipped with at least one current injector.

BRIEF DESCRIPTION OF THE FIGURES

This invention will be understood more clearly upon reading the description of example embodiments given purely for information reasons and which are in no way limitative, accompanied by the appended figures wherein.

On these figures, identical elements are denoted by the same reference characters.

DETAILED PRESENTATION OF PARTICULAR EMBODIMENTS

Figure 2:
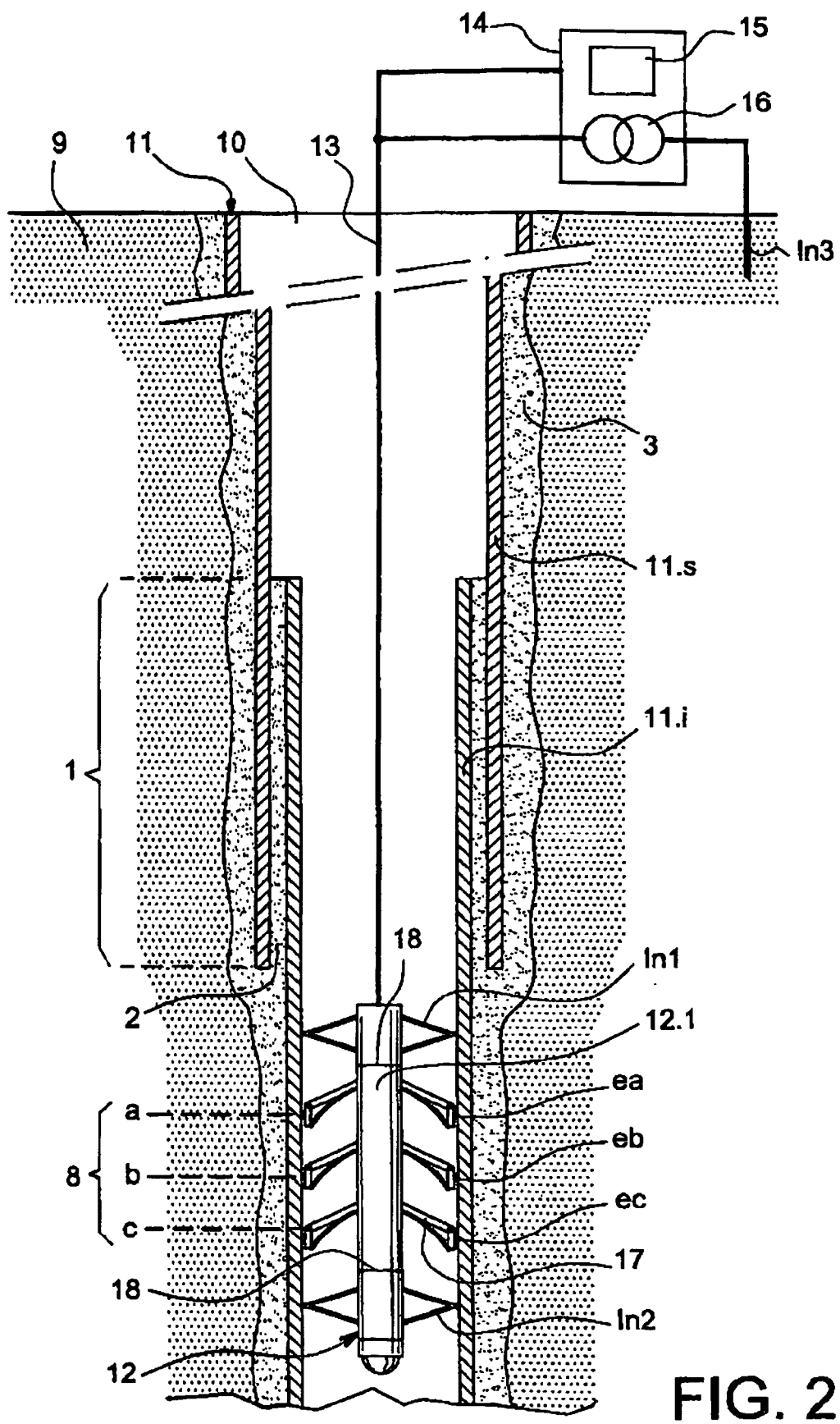
FIG. 2 diagrammatically shows a device according to prior art for measuring the resistivity of formations.

We will now refer to FIG. 2 which shows an example device for implementation of the resistivity measurement process according to prior art in position in a lined well 10. The device may be comparable with that described in French patent application FR-A1-2 793 031 [1] mentioned above.

The device shown comprises an adapted probe 12 that can be displaced in the well 10 made in a geological formation 9 and equipped with an electrically conducting lining 11.

The lining 11 may be formed as shown in FIG. 2 by several tube segments, generally made of steel. Only two tube segments have been referenced, to avoid confusing the figures, one is called the upper tube segment 11.s and the other is called the lower tube segment 11.i. These tube segments do not all have the same diameter and they are coaxial when they are in place. These tube segments are lowered into the well 10 one after the other, starting with the smallest and ending with the largest, and with an overlap part 1 between two successive tube segments 11.s and 11.i. There is a space 2 between the outside diameter of the lower tube segment 11.i and the inside diameter of the upper tube segment 11.s. Cement 3 is placed between the outside of the lining tube segments and the formation in which the well 10 is formed, and in the space 2.

The probe 12 is linked through an electrical cable 13 to equipment 14 located on the surface. This equipment 14 may comprise data acquisition and processing means 15 processing data supplied by the probe 12 and the electrical power supply means 16. It also comprises means, not shown, for controlling the extension and retraction of the arms of electrodes ea, eb, ec, and possibly $In_1$ and $In_2$.

The probe 12 comprises a body 12.1 and a group of at least three measurement electrodes ea, eb and ec that can come into contact with the lining 11 by delimiting lining sections a-b, b-c. For example, the length of these sections is between 40 and 80 centimeters. The electrodes ea, eb, ec may be lifted at the end of the hinged arms 17 that connect them to the body 12.1. These arms 17 may be extended so that they apply the electrodes ea, eb and ec in contact with the lining 11 when it is required to make the measurements, and retracted when the measurements are terminated. When they are extended, these arms make good electrical contact between the electrode that they support and the lining 11, and when they are retracted, the probe 12 can be moved without friction within the lining 11. The probe 12 also comprises two current injectors In1, In2 located on each side of the group of measurement electrodes ea, eb and ec.

Insulating connections 18 are placed on each side around the body 12.1 of the probe 12 between the current injectors In1, In2 and the measurement electrodes ea, eb, ec to electrically isolate the measurement electrodes ea, eb and ec from the current injectors In1, In2. The spacing between a current injector In1, In2 and the measurement electrode ea, ec closest to it may be of the same order of magnitude as the space between two successive measurement electrodes.

Current injectors In1, In2 may be made as described in patent application FR-A1-2 739 031 [01]. They may be placed on the hinged arms.

The device also comprises a current return electrode In3, at a distance from the current injectors In1, In2. It may be located on the surface at the head of the lined well 10 if the well is sufficiently deep, or it may be on the surface but at a distance from the lined well head. The current injectors In1, In2 and the current return electrode In3 are supplied with current and are connected to electrical power supply means that comprise the electrical power supply source 16 mentioned above on the surface, and depending on the case, an additional source (not shown) located in the probe 12 and appropriate switching circuits to change from one to the other.

In FIG. 2, probe 12 is in a position in which the resistivity of the formation located within a measurement zone 8 at the measurement electrode group ea, eb and ec can be determined. These measurement electrodes ea, eb and ec are in contact with the lower tube segment 11.i.

In this position of the probe 12, the leakage current Ifor in the formation 9 in the measurement zone 8 is determined, for example using the process described in this presentation or in patent application FR-A1-2 793 031 [01], by circulating current in the lining 11 using at least one injector In1, In2 and measuring potentials using measurement electrodes. This leakage current Ifor is representative of the resistivity of the formation in the measurement zone. As described above, it is still necessary to determine the potential of the lining 11 in the measurement zone with respect to a reference at infinity, before the measured resistivity Rm of the formation in the measurement zone 8 can be determined.

This can be done as described above or in patent application FR-A1-2 793 031 [01] using the electrode eb and a reference electrode (not shown), for example placed on the surface at a distance from the current return electrode In3 or in the well.

The measurements are restarted in the same way at different levels in the well by moving the probe in steps, each step being of the order of twice the distance between consecutive voltage measurement electrodes.

Figure 3:
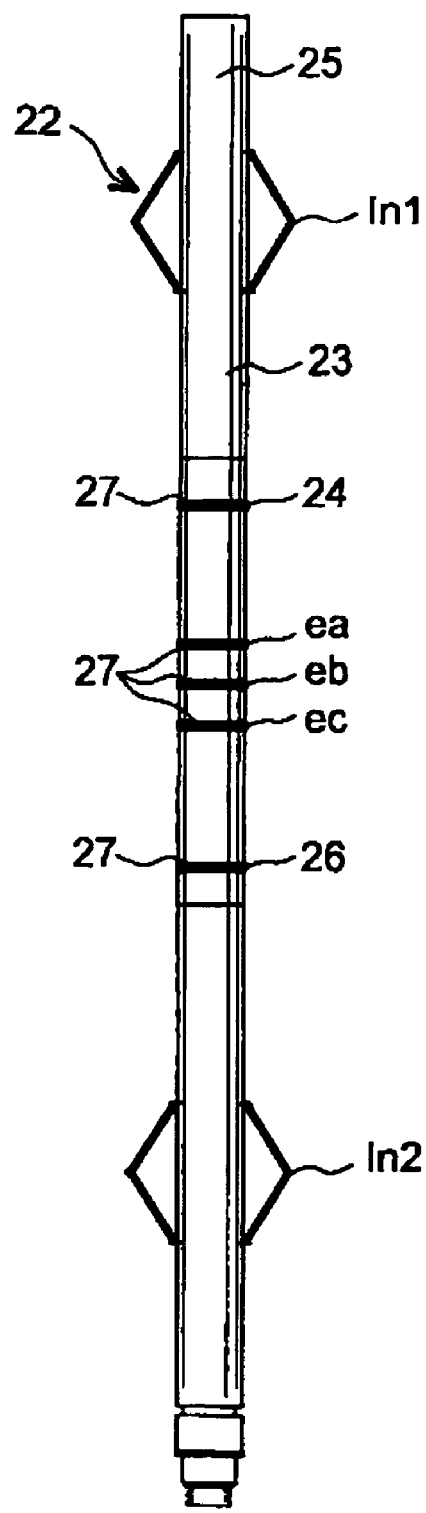
FIG. 3 is an example embodiment of a device according to the invention comprising secondary electrodes according to the invention, for measuring the resistivity of formations.

FIG. 3 shows an example embodiment of a probe 22 according to the invention.

The probe 22 comprises a set of three primary voltage measurement electrodes ea, eb and ec arranged at a vertical spacing between consecutive electrodes, at a distance of between 40 and 80 cm as in prior art. The vertical resolution of a measurement made with these primary electrodes is approximately equal to the distance between the end voltage measurement electrodes ea and ec.

In the example shown, the vertical spaces between consecutive electrodes are equal to each other.

This arrangement with three electrodes ea, eb and ec only enables one measurement at a time. Naturally, an arrangement comprising more primary electrodes, for example 4, as described in the reference article [3] and enabling two simultaneous measurements, is compatible with the invention.

According to the invention, the probe 22 also comprises the set of primary voltage measurement electrodes ea, eb and ec, an upper secondary voltage measurement electrode 24 and a lower secondary voltage measurement electrode 26. These electrodes 24 and 26 are located vertically on each side of the set of primary electrodes ea, eb and ec. In the example shown, the spacings between the central primary electrode eb and each of the secondary electrodes 24, 26 are equal to each other. This equal spacing is not compulsory. The result of this arrangement is that the spacing between a central primary electrode and one of the Is secondary electrodes is greater than the spacing between the primary electrodes.

In the example shown with three primary electrodes, the central electrode is obviously the single electrode eb that is located between the two end primary electrodes ea, ec. In a set of primary electrodes with more than three electrodes, a central primary electrode may be any one of the primary electrodes located between the two end electrodes in the set.

Figure 4A:
FIGS. 4A and 4B contain diagrams showing the arrangement of voltage measurement electrodes for sets with three or four primary electrodes respectively.
Figure 4B:

FIGS. 4A and 4B show diagrammatic configurations of secondary electrodes (24, 26) and primary electrodes ea, eb, ec and ed. FIG. 4A shows an assembly with three primary electrodes ea, eb, ec. In this case, the central electrode is eb and the secondary electrodes are 24, 26. The vertical resolution that can be obtained with the set of electrodes shown in FIG. 4A is approximately equal to the spacing between the end electrodes, in other words electrodes ea and ec. In the examples shown, the spacings between the primary consecutive electrodes are equal to each other, and particularly equal to a distance of between 40 and 80 cm and typically 60 cm. The result is that the spatial resolution that can be obtained is between 80 and 160 cm. The spacing between the central electrode eb and the upper electrode 24 is obviously greater than the spacing between the electrode eb and the electrode ea. In the example embodiment described herein, the spacing between the central electrode and the upper electrode 24 is equal to three times the spacing between the central electrode eb and the end upper electrode ea.

Thus, if the spacing between the central electrode eb and the extreme upper electrode ea is 60 cm, the spacing between the central electrode eb and the electrode 24 will be 180 cm. In this example embodiment, the electrode 26 is arranged symmetrically to electrode 24 about the central electrode eb. The result is that the spacing between the secondary electrodes 24, 26 is 360 cm, and that the spatial resolution made with the secondary electrodes 24, 26 is also equal to 360 cm. With the same arrangement as when the spacing between consecutive primary electrodes varies from 40 to 80 cm, the spacing between the secondary electrodes varies between 240 and 480 cm. The same is true for the vertical resolution that can be obtained with these secondary electrodes. The dynamic range that can be obtained with the primary electrodes is typically between 1 and 100 ohm.m, and the dynamic range that can be obtained with the secondary electrodes is typically between 1 and 300 ohm.m.

The circuit shown in FIG. 4B is a circuit with four electrodes. There is one additional electrode ed between the primary electrodes eb and ec. In this case, the measurement with the secondary electrodes will be made with either the two central electrodes eb and ec.

If the spacings between the primary electrodes are equal to each other and are between 40 and 80 cm, the spacing between the end electrodes is between 120 and 240 cm, the spacing between the secondary electrodes 24, 26 will be about seven times the spacing between consecutive primary electrodes and will therefore be between 280 and 560 cm. In summary, the spacings between secondary electrodes will typically be between 240 and 560 cm.

In the examples commented upon above, it was implicitly assumed that the distance between an end electrode and the distance from the closest secondary electrode would be twice the spacing between consecutive primary electrodes. This spacing between end primary electrodes and the closest secondary electrode may be up to 1.5 times the spacing between consecutive primary electrodes. Thus, for a spacing of 60 cm between primary electrodes, the spacing between secondary electrodes could reasonably be between 300 and 420 cm. The spacing of 300 corresponding to the case in which the secondary electrode is at a distance of 1.5 times the spacing between primary electrodes from the closest primary electrode, and the distance of 420 cm corresponds to the case in which this spacing s between the end electrodes and the closest secondary electrode is equal to twice the spacing between the primary electrodes, the set of primary electrodes having four electrodes.

When the spacings between the primary electrodes are not equal to each other, the values given above can be used for the spacing between secondary electrodes by introducing the average distance between the consecutive primary electrode.

In the embodiment shown in FIG. 3, the potential measurement electrodes ea, eb and ec are not extendable electrodes. These electrodes are composed of conducting rings 27 arranged to be electrically isolated from the rest of the probe body. The rings 27 have approximately the same diameter as the diameter of the probe body. Replacement of the extendable electrodes, for example shown in FIG. 2 or in the reference article 3, by these rings, is based on the idea that the equipotential surfaces in a zone located in the well and in the immediate vicinity are composed of planes perpendicular to the centerline of the lining. The result is that it is not necessary for the potential measurement electrodes to be in contact with the lining 11.

Figure 1:
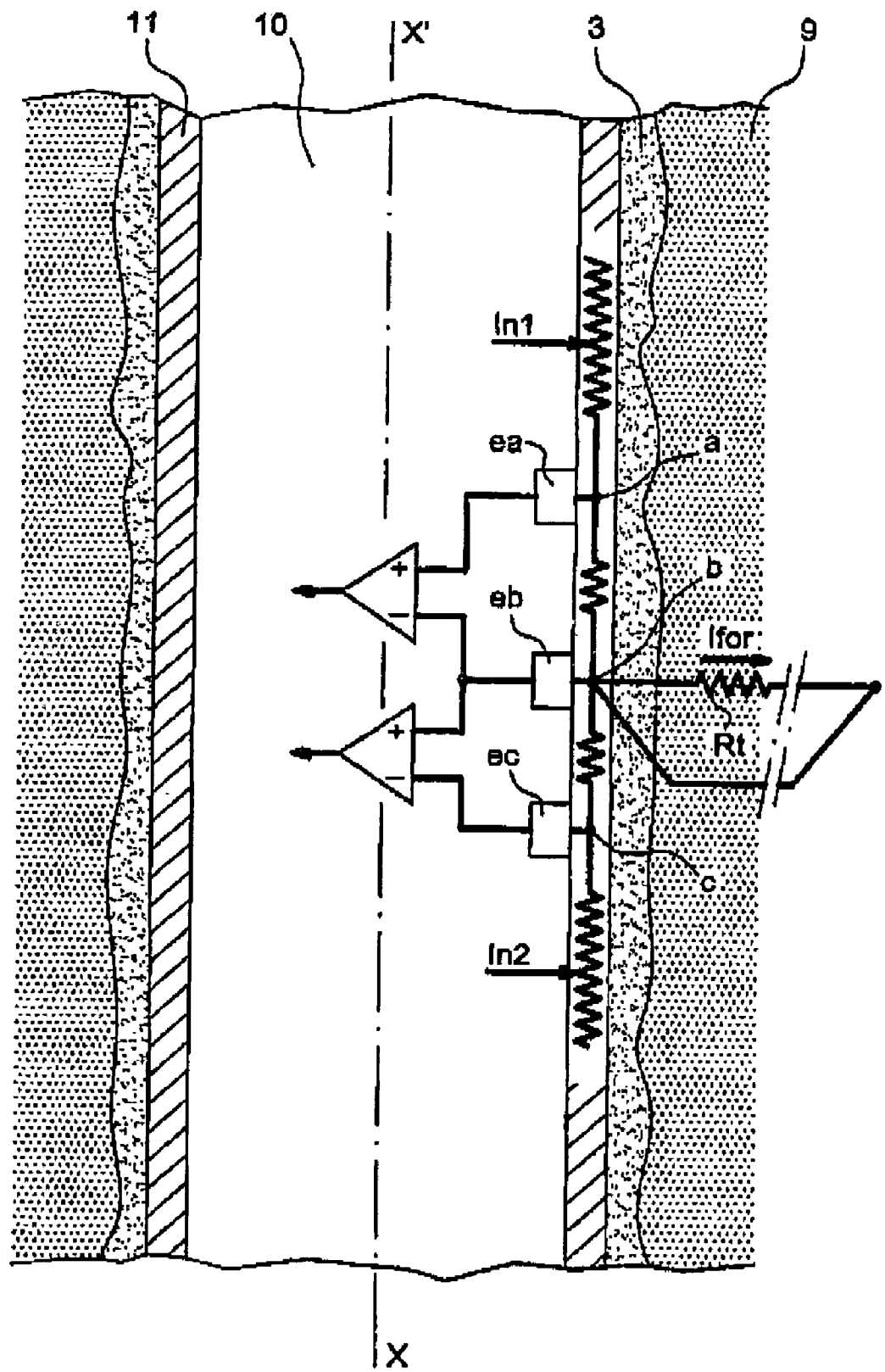
FIG. 1, already described, summarizes the principle of resistivity measurement in a lined well.

Taking account of this modification, which may also be applied to probes according to prior art as shown in FIG. 1B, the dimension of the probe may be reduced. This dimension is reduced particularly due to the fact that the means of deploying the potential measurement electrodes are no longer present. Consequently, the probe can be made more compact, such that despite the additional secondary electrodes, the longitudinal length of the probe is hardly longer than a probe according to prior art with the voltage measurement electrodes deployed.

Figure 5A:
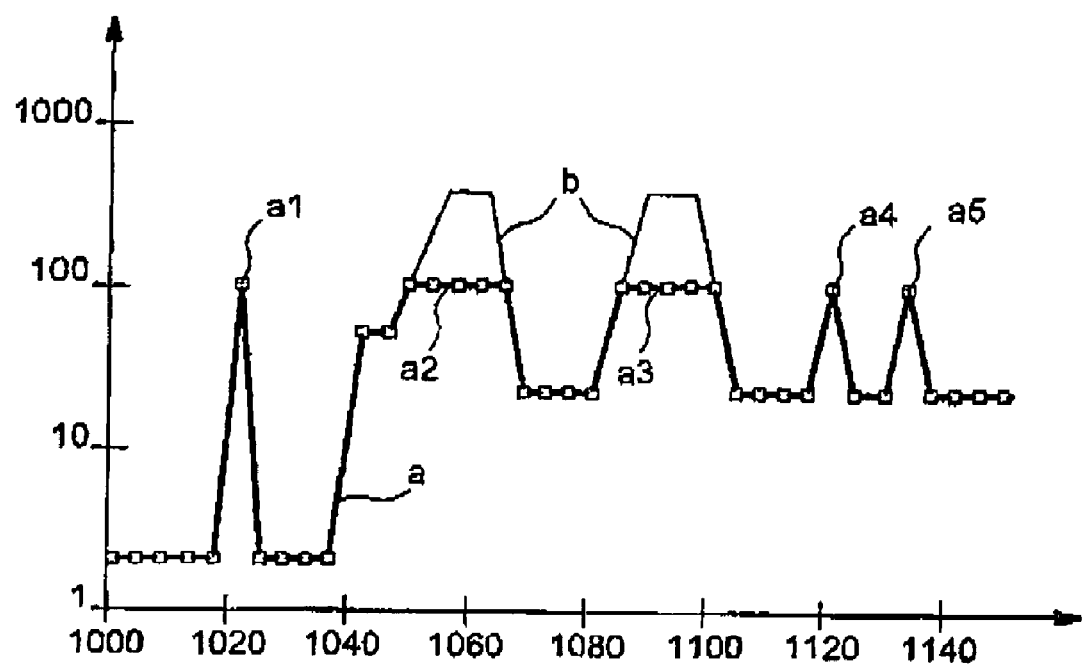
FIGS. 5A and 5B show examples of resistivity curves calculated with the measurement results according to the "primary" method and the "secondary" method of measuring the resistivity respectively, together with a summary.

The use of the improved probe comprising a set of secondary electrodes may be the same as that described above in the section on the description of the invention. The probe is moved in steps equal to approximately twice the spacing between consecutive electrodes. At each station, a potential measurement is made after injecting a current using the primary and secondary electrodes. The measurement results obtained from the primary electrodes are used to plot the profile of the variation of the resistivity of the formation shown in FIG. 5A. The ordinate of curve a in FIG. 5A represents the values of the resistivity of the formation in ohm.m, and the abscissa represents the measurement bottom depths.

Figure 5B:
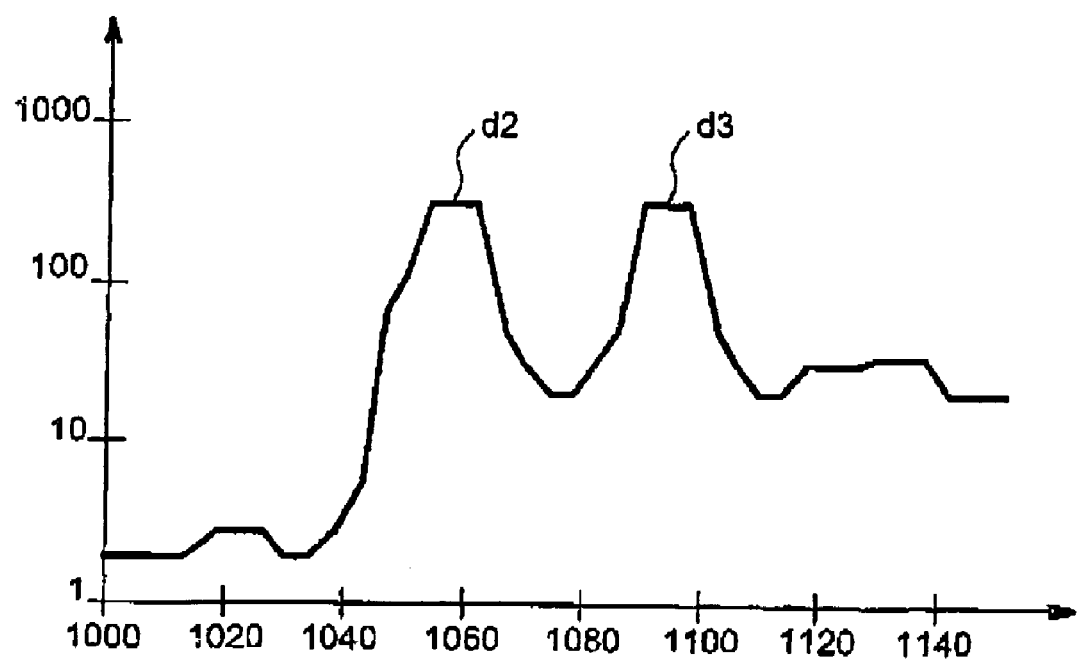

The different measurement depths are indicated by small squares. The graduations on the abscissa represent steps of twenty feet starting from one thousand, and on average there are five measurement points for every twenty feet. This indicates that the spatial resolution is about four feet and that the spacing between consecutive electrodes is two feet, or about 60 cm. It can be seen that the curve a comprises five zones referenced a1 to a5 for which the value of the resistivity of the formation is 100. At this stage, it is not possible to see if this value is due to the limitation of the measurement means, or if it is the real value of the resistivity of the formation. The curve in FIG. 6B shows the same resistivity profile, but in this case obtained with a central primary electrode and the two secondary electrodes 24, 26. The points a1, a4 and a5 shown in FIG. 5A, are no longer visible on this curve. This is due to the lack of vertical resolution obtained with the secondary electrodes. However, the spaces a2 and a3 limited to a maximum of 100 ohms in FIG. 5A represent a value corresponding to about 200 ohms at points a2 and a3. Thus, the profile obtained in FIG. 5A using the primary electrodes may be improved by the addition of peaks a2 and a3 taken from FIG. 5B and obtained with the secondary electrodes. The improved profile is thus composed partly of curve a as obtained with the primary electrodes, and partly of curve b obtained with the secondary electrodes. The parts of curves b are substituted for parts of curve a at the locations, for example a2, a3, where the value obtained with the primary curves is limited to 100.

The improved probe may also be used differently. Due to the fact that the improved probe does not contain any deployed contacts rubbing against the lining when the probe is displaced, measurement noise caused by this friction is not present when the improved probe is displaced. Consequently, the resistivity may also be determined continuously. In the continuous measurement process, the probe is moved, for example at constant speed, along the axial direction of the lining and the measurement is made iteratively and continuously. The resistivity profile is thus obtained continuously and no longer in steps, as in the previous case in which the probe was displaced in steps. When the description mentions a continuous profile, the word continuous must not be understood in the mathematical sense of the term, according to which the spatial interval between two measurements can be made as small as we wish. Since the measurement process is iterative, this means that a resistivity determination is made at time intervals with a spacing between them equal to the time necessary for execution of a measurement and a calculation related to this measurement. In terms of distance, this means making measurements at intervals equal to the distance traveled by the probe during the said duration necessary for execution of a measurement and a calculation. It can thus be seen that a practically continuous profile can be obtained by choosing a low displacement speed. is In this embodiment, the invention relates to an iterative continuous process for determination of an improved continuous profile of the variation of the resistivity of the geological formation 9 surrounding a well 10 equipped with a conducting lining 11 along the axial direction of the tube, process in which a local resistivity of the formation 9 is determined by continuously injecting a current into the lining so as to cause a leakage current in an instantaneous measurement zone of the formation 9 and by measuring values of the potential at first instantaneous positions (ea, eb, ec) at a spacing between them equal to the average value, the first instantaneous positions comprising at least one central position (eb) positioned in the axial direction between an instantaneous top end position (ea) and an instantaneous bottom end position (eb) and by calculating a local value of the leakage current in the formation 9 from the measurement results, to deduce a value of the resistivity of the said formation in the said instantaneous measurement zone and then iteratively restarting the measurement by continuously displacing the first potential measurement positions along the axial direction, to deduce a first continuous profile for variation of the resistivity along the axial direction.

For each local potential measurement made in the first instantaneous positions, potential measurements at two instantaneous second positions on each side of the first positions are made simultaneously, a second instantaneous position being at a distance from the closest first instantaneous end position by a distance greater than 1.5 times the average value of the spacing between two consecutive positions of the first instantaneous positions, to deduce a second profile of the variation of the resistivity along the axial direction, and then correcting the first continuous profile by replacing the values of the resistivity in the first profile for the first instantaneous axial positions, by resistivity values of the second profile when the resistivity values of the second profile at the same instantaneous first axial positions are greater than the first values, the profile thus corrected forming the improved continuous profile.

Thus, in this embodiment of the process according to the invention, the first and second positions are moved continuously along the axial direction, the resistivity being determined iteratively and continuously during the displacement of the first and second positions, in order to obtain an improved continuous profile of the resistivity in the axial direction.

List of Mentioned Documents

[1] Patent FR-A1-2 793 031

[2] Patent FR-A1-2 793 032

[3] Article by Dominique BENIMELI, et al published on pages 2-25 of the "Oilfield Review", Spring 2001, Volume 13, Number 1, for which articles are available at address cedpm.Houston@cexp.com.

The invention claimed is:

1. Process for determining an improved profile of a variation along an axial direction of a resistivity of a geological formation surrounding a well equipped with a lining along the said axial direction, process in which a local resistivity of the formation is determined by injecting a current in the lining to create a leakage current in the formation measurement zone and measuring potential values at first positions with a spacing between consecutive positions equal to an average value, the first positions comprising at least one central position (eb) between an upper end position (ea) and a lower end position (ec) along the axial direction, and using the measurement results to calculate a local value of the leakage current in the formation to determine a value of the resistivity of the said formation in the said measurement zone and then to restart the measurement by moving the first potential measurement positions along the axial direction, to deduce a first profile of the variation of the resistivity along the axial direction, process, wherein for each local potential measurement made in the first positions, a potential measurement at two second positions is made simultaneously on each side of the first positions, a second position being at a distance from the closest end position of more than 1.5 times the average value of the spacing between consecutive positions to deduce a second profile for the variation of the resistivity along the axial direction and then to correct the first profile by replacing resistivity values of the first profile for the first axial positions by resistivity values of the second profile when the resistivity values of the second profile at the same first axial positions are greater than the first values, the profile thus corrected forming the improved profile.

2. Process according to claim 1, wherein the first and second positions are displaced continuously along the axial direction, the resistivity being determined iteratively and continuously during displacement of the first and second positions, in order to obtain a continuous improved profile of the resistivity in the axial direction.

3. Probe for measuring the resistivity of a geological formation surrounding a well equipped with a lining conducting electricity, comprising:

a body of a probe, that is approximately cylindrical, defining an axial direction of the probe, a set of at least three primary voltage measurement electrodes (ea, eb, ec), two end electrodes (ea, ec), one upper electrode (ea) and one lower electrode (ec) and at least one central electrode (eb), a spacing between two consecutive electrodes (ea, eb, ec) in this set of primary electrodes in the axial direction of the body of the probe with an average spacing value, two electrodes (In1, In2), an upper (In1) and a lower (In2) current injection electrodes arranged along the axial direction of the body of the measurement probe, on each side of the set of primary electrodes, wherein the probe also comprises, two secondary voltage measurement electrodes arranged along the axial direction of the probe on each side of the set of the primary electrodes (ea, eb, ec), and a first secondary electrode between the two injection electrodes (In1, In2), located between the upper current injection electrode (In1) and the upper voltage measurement electrode (ea), the other being located between the lower current injection electrode (In2) and the lower end voltage measurement electrode (ec), the spacing between a secondary electrode and the closest primary end electrode (ea, ec) being more than 1.5 times the average spacing between the primary electrodes (ea, eb, ec); and the primary electrodes (ea, eb, ec) and the secondary electrodes are formed conducting rings implanted axially on the body of the probe, these rings having approximately the same diameter as the body; and the spacings between the primary electrodes (ea, eb, ec) are equal to 40 and 80 cm, the secondary electrodes being at spacings of between 240 and 560 cm.

4. Probe for measuring the resistivity of a geological formation surrounding a well equipped with a lining conducting electricity, comprising:

a body of a probe, that is approximately cylindrical, defining an axial direction of the probe, a set of at least three primary voltage measurement electrodes (ea, eb, ec), two end electrodes (ea, ec), one upper electrode (ea) and one lower electrode (ec) and at least one central electrode (eb), a spacing between two consecutive electrodes (ea, eb, ec) in this set of primary electrodes in the axial direction of the body of the probe with an avenge spacing value, two electrodes (In1, In2), an upper (In1) and a lower (In2) current injection electrodes arranged along the axial direction of the body of the measurement probe, on each side of the set of primary electrodes, wherein the probe also comprises, two secondary voltage measurement electrodes arranged along the axial direction of the probe on each side of the set of the primary electrodes (ea, eb, ec), and a first secondary electrode between the two injection electrodes (In1, In2), located between the upper current injection electrode (In1) and the upper voltage measurement electrode (ea), the other being located between the lower current injection electrode (In2) and the lower end voltage measurement electrode (ec), the spacing between a secondary electrode and the closest primary end electrode (ea, ec) being more than 1.5 times the average spacing between the primary electrodes (ea, eb, ec); and the primary electrodes (ea, eb, ec) and the secondary electrodes are formed from conducting rings implanted axially on the body of the probe, these rings having approximately the same diameter as the body; and the spacings between the primary electrodes (ea, eb and ec) are about 60 cm, the secondary electrodes being at spacings of between 300 and 420 cm.

* * * * *